US012626635B2

(12) United States Patent
Wang et al.

(10) Patent No.: US 12,626,635 B2
(45) Date of Patent: May 12, 2026

(54) ELECTRONIC DEVICE DISPLAY WITH REAL-TIME MODE SWITCHING

(71) Applicant: Apple Inc., Cupertino, CA (US)

(72) Inventors: Xiaofeng Wang, San Jose, CA (US); Yafei Bi, Los Altos Hills, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 18/683,940

(22) PCT Filed: Aug. 12, 2022

(86) PCT No.: PCT/US2022/040206
§ 371 (c)(1),
(2) Date: Feb. 15, 2024

(87) PCT Pub. No.: WO2023/038762
PCT Pub. Date: Mar. 16, 2023

(65) Prior Publication Data
US 2024/0363052 A1 Oct. 31, 2024

Related U.S. Application Data

(60) Provisional application No. 63/243,623, filed on Sep. 13, 2021.

(51) Int. Cl.
*G09G 3/20* (2006.01)

(52) U.S. Cl.
CPC ..... *G09G 3/2096* (2013.01); *G09G 2330/026* (2013.01); *G09G 2330/027* (2013.01); *G09G 2370/00* (2013.01)

(58) Field of Classification Search
None
See application file for complete search history.

(56) References Cited

U.S. PATENT DOCUMENTS 10,762,870 B2 * 9/2020 Han ....................... G09G 5/006
11,676,557 B2 * 6/2023 Park ......................... G09G 5/12 345/1.1
11,810,519 B2 * 11/2023 Cheon ................. G09G 3/2096
(Continued)

FOREIGN PATENT DOCUMENTS

KR 20130027094 A 3/2013

*Primary Examiner* — Duane N Taylor, Jr.
(74) *Attorney, Agent, or Firm* — Treyz Law Group, P.C.; Jason Tsai; Jinie M. Guihan

(57) ABSTRACT

An electronic device may include a display, a display driver integrated circuit for controlling the display, and a system processor for running one or more applications on the electronic device. The display may be operated in at least a video mode and a command mode. In the video mode, the system processor operates as the primary timing circuit while the display driver integrated circuit operates as the secondary timing circuit. In the command mode, the display driver integrate circuit operates as the primary timing circuit while the system processor operates as the secondary timing circuit. The system processor may be configured to switch between video mode and the command mode without turning off the electronic device and without turning off the display driver integrated circuit. If desired, the display can be temporarily turned off during a mode switching event to hide potential front of screen artifacts.

20 Claims, 7 Drawing Sheets

(56) References Cited

U.S. PATENT DOCUMENTS

| | | | | |
|---|---|---|---|---|
| 11,935,502 | B2 * | 3/2024 | Zhang | G09G 5/18 |
| 2018/0033360 | A1 | 2/2018 | Bae et al. | |
| 2023/0306913 | A1 * | 9/2023 | Hatayama | G09G 3/3275 |

* cited by examiner

ELECTRONIC DEVICE DISPLAY WITH REAL-TIME MODE SWITCHING

This application claims priority to. U.S. provisional patent application No. 63/243,623, filed Sep. 13, 2021, which is hereby incorporated by reference herein in its entirety.

BACKGROUND

This relates generally to electronic devices and, more particularly, to electronic devices with displays.

Electronic devices such as computers and cellular telephones have displays. A display typically includes an array of display pixels controlled by a timing controller integrated circuit. One or more processors such as an applications processor in an electronic device can communicate with the timing controller integrated circuit to establish a mode of operation for the display. The display can be operated in a plurality of modes. In one mode, the applications processor serves as the master device that determines the overall timing behavior of the display while the timing controller acts as the slave device. In another mode, the timing controller acts as the master device while the applications processor acts as the slave device.

To switch between the different modes of operation, the electronic device needs to be turned off and then initialized to the new mode upon power on. Power cycling the electronic device to switch between the different modes may be inefficient.

SUMMARY

An electronic device may include a display having an array of pixels for displaying images for a viewer. The electronic device may further include control circuitry and a display driver integrated circuit for controlling the display. The control circuitry may include one or more processors coupled to the display via a flexible printed circuit. The display driver integrated circuit may be mounted on the flexible printed circuit.

The electronic device may be operable in a first (video) mode and a second (command) mode. In the video mode, the processor such as an application processor or a system processor is configured as the primary (master) timing device while the display driver integrated circuit is configured as the secondary (slave) timing device. In the command mode, the display driver integrated circuit is configured as the primary timing device while the processor is configured as the secondary timing device. The electronic device can switch between the video mode and the command mode in real time without having to turn off the electronic device and/or the display driver integrated circuit.

To switch from the video mode to the command mode in real time, the processor may turn off the display, send a mode selection command directing the display driver integrated circuit to switch from the video mode to the command mode, receive a tearing effect signal from the display driver integrated circuit, and, in response to receiving the tearing effect signal, send new image data to the display driver integrated circuit and turn on the display to output the new image data.

To switch from the command mode to the video mode in real time, the processor may turn off the display, send a mode selection command directing the display driver integrated circuit to switch from the command mode to the video mode, send timing information to the display driver integrated circuit, wait for the display driver integrated circuit to synchronize with the processor using the timing information, and turn on the display after the display driver integrated circuit has synchronized with the control circuitry using the timing information.

DETAILED DESCRIPTION

Figure 1:
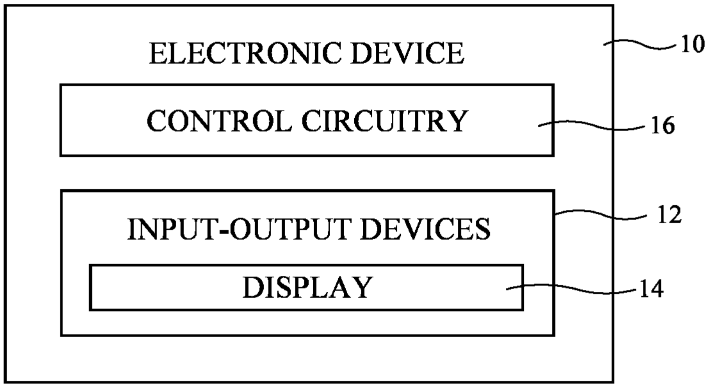
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. Control circuitry 16 may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, applications processors, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input resources of input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the display pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Display 14 may be a liquid crystal display or may be a display based on other types of display technology (e.g., organic light-emitting diode displays). Any suitable type of display may be used, if desired. In general, display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
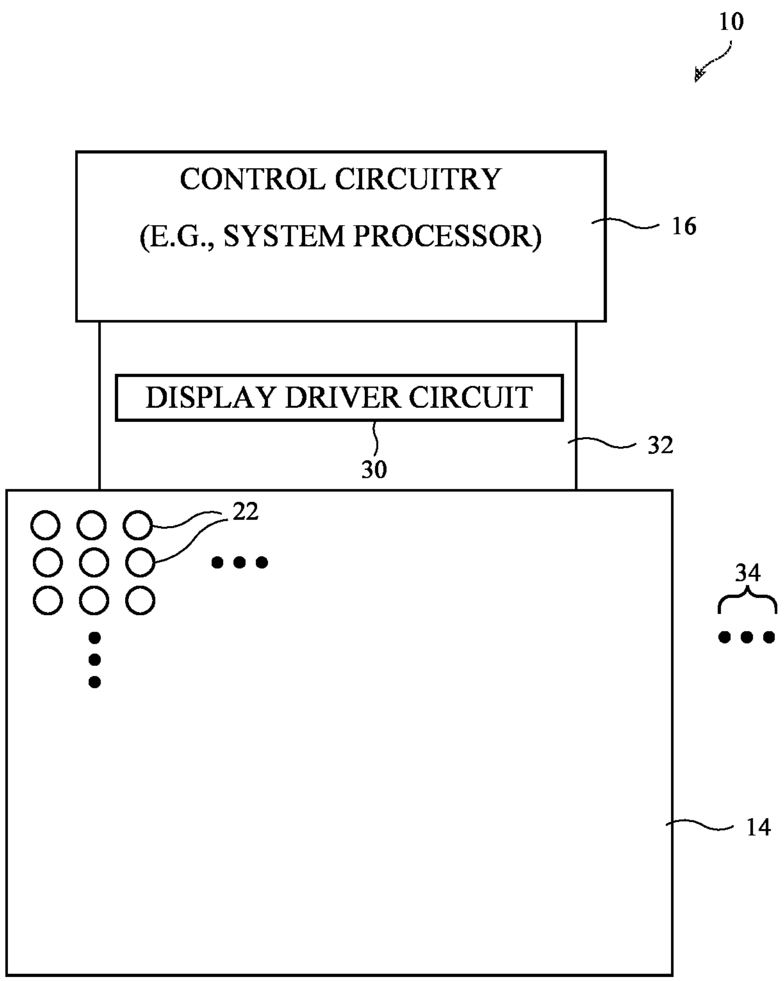
FIG. 2 is a diagram of an illustrative display panel coupled to a display driver integrated circuit in accordance with some embodiments.

FIG. 2 is a top view of display 14 showing how display 14 may have an array of pixels 22. Pixels 22 may have color filter elements of different colors such as red color filter elements R, green color filter elements G, and blue color filter elements B. Pixels 22 may be arranged in rows and columns and may form an active area of display 14. The rectangular shape of display 14 in FIG. 2 is merely illustrative. If desired, the active area may have a non-rectangular shape (e.g., a shape with one or more curved portions). For example, the active area may have rounded corners in one example. Display 14 having the array of pixels 22 is sometimes referred to as the display panel.

Display circuitry such as a display driver integrated circuit, gate driver circuitry, and column driver circuitry may be used in controlling the array of pixels in display 14 to present images on display 14 for a user of device 10. Column driver circuitry may provide data signals to data lines that run vertically through display 14. Gate driver circuitry may be used to assert a control signal on horizontal control lines. Some of the display circuitry may be formed from thin-film circuits on a thin-film transistor layer or other substrate in the display layers of display 14. As an example, the gate driver circuitry and/or the column driver circuitry may be formed on the same thin-film transistor layer in which the display pixels are formed. Other display circuitry may be formed from integrated circuits and may be mounted on a ledge portion of display 14, on a substrate adjacent to display 14, or may be mounted on a printed circuit substrate.

A flexible printed circuit cable such as flexible printed circuit 32 may be used to join display 14 and associated the display circuitry with control circuitry 16. Components such as a display driver integrated circuit 30 (sometimes referred to as a timing controller integrated circuit), a board-to-board connector or other connectors may be mounted on flexible printed circuit cable 32. Display driver integrated circuit 30 may communicate directly with control circuitry 16 to send control and data signals to the column driver circuitry and the gate driver circuitry on the display panel. In other words, control circuitry 16 controls display 14 through display driver integrated circuit 30 (i.e., control circuitry 16 is coupled to display 14 via timing controller 30).

Cable 32 of FIG. 2 may be a flexible printed circuit that contains no rigid printed circuit board portions or may be the type of flexible printed circuit that is sometimes referred to as "rigid flex" and that has rigid printed circuit board regions combined with flexible regions. With one illustrative arrangement, the ends of flexible printed circuit 32 may be rigid printed circuit board portions (e.g., printed circuits formed from layers of rigid printed circuit board material such as fiberglass-filled epoxy) and the central portion of flexible printed circuit 32 may be formed from a length of flexible printed circuit that does not contain rigid portions (e.g., a flexible printed circuit formed form a flexible polymer substrate such as polyimide). Other types of flexible printed circuit may be used in forming a cable that extends between the display panel and control circuitry 16.

As described above in connection with FIG. 1, circuitry 16 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more processors, microprocessors, microcontrollers, digital signal processors, baseband processors, power management units, audio codec chips, application specific integrated circuits, etc. The storage and processing circuitry of circuitry 16 may be used to run software on device 10, such as internet browsing applications, voice-over-internet-protocol (VOIP) telephone call applications, email applications, media playback applications (e.g., applications that display moving and still images on display 14), operating system functions, etc. The storage and processing circuitry of circuitry 16 is therefore sometimes referred to as an application processor or a system processor. If desired, control circuitry 16 may be used in controlling more than one display panel 14, as shown by ellipses 34.

Figure 3:
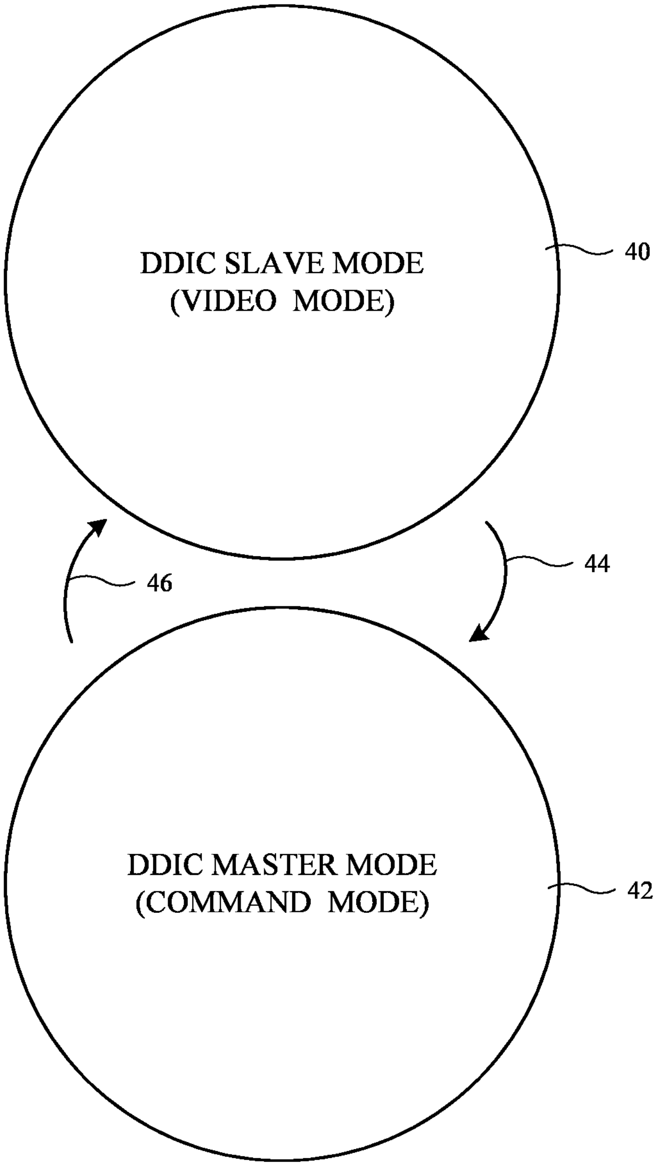
FIG. 3 is diagram showing illustrative display modes in accordance with some embodiments.

FIG. 3 illustrates at least two different display modes for operating electronic device 10. As shown in FIG. 3, electronic device may be operated in a first display mode 40 and a second display mode 42. In the first mode 40, control circuitry 16 (e.g., the application or system processor) operates as the primary timing device for controlling, directing, or orchestrating the timing behavior of the overall display whereas display driver integrated circuit 30 operates as the secondary timing device. The primary timing device is sometimes referred to as the primary timing component, the primary timing module, the timing primary, or the primary timer. The secondary timing device is sometimes referred to as the secondary timing component, the secondary timing module, or the secondary timer. As the primary (dominant or main) component during mode 40, control circuitry 16 defines the start of each video frame, the frame period, the frame rate, and other timing parameters of the video being output by display 14. As the secondary (auxiliary) component, display driver integrated circuit 30 follows the lead of control circuitry 16. Mode 40 is therefore sometimes referred to as the video mode or the display driver integrated circuit (DDIC) secondary mode.

In the second mode 42, display driver integrated circuit 30 (e.g., the display timing controller) operates as the primary timing module for controlling, directing, or orchestrating the timing behavior of the overall display whereas control circuitry 16 operates the secondary timing module. As the primary timing module, display driver integrated circuit 30 may output a tearing effect (TE) signal or other synchronization signal that notifies control circuitry 16 of a certain window of time when control circuitry 16 can send the next frame. The tearing effect signal may help synchronize control circuitry 16 with DDIC 30 during mode 42 to prevent screen tearing. Screen tearing is a visual artifact phenomenon where a display outputs information from multiple video frames in a single frame due to a lack of synchronization. As the auxiliary component, control circuitry 16 follows the lead of display driver integrated circuit 30. During mode 42, display driver integrated circuit 30 may periodically send tearing effect signals to control circuitry 16. The amount of time between when successive tearing effect signals are sent may defined the frame rate (as an example). Mode 42 is therefore sometimes referred to as the command mode or the display driver integrated circuit (DDIC) primary mode.

In accordance with an embodiment, electronic device 10 can switch between video mode 40 and command mode 42 during normal operation of display 14 in real time without having to turn off device 10. As an example, device 10 may switch from operating in video mode 40 to operating in command mode 42 (as indicated by mode transition 44) in real time without turning off device 10 or display driver integrated circuit 30. As another example, device 10 may switch from operating in command mode 42 to operating in video mode 40 (as indicated by mode transition 46) in real time without turning off device 10 or display driver integrated circuit 30.

Figure 4:
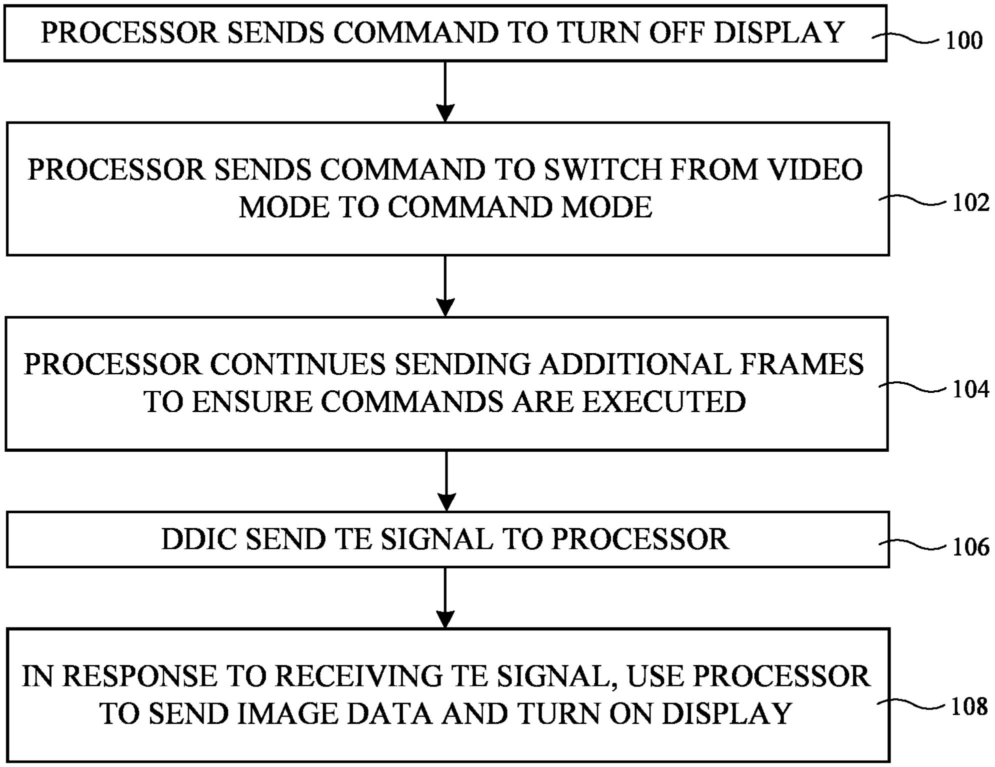
FIG. 4 is a flow chart of illustrative operations for switching from a display video mode to a display command mode in accordance with some embodiments.

FIG. 4 is a flow chart of illustrative operations for switching from video mode 40 to command mode 42. During the operations of block 100, one or more processors in control circuitry 16 (e.g., an application processor or system processor) may send a command to display driver integrated circuit 30 to turn off display 14. The display panel will be deactivated or output a black screen in response to such display off command. Turning off the display can help hide any potential front-of-screen issues that might occur when switching between different display modes.

During the operations of block 102, the one or more processors in control circuitry 16 may send a command directing display driver integrated circuit 30 to switch from video mode 40 to command mode 42. This command is sometimes referred to as a mode switching or mode selection command.

During the operations of block 104, the one or more processors in control circuitry 16 may continue sending primary timing information to display driver integrated circuit 30 to ensure that commands of blocks 100 and 102 have been executed. For example, control circuitry 16 may continue sending, for one or more frames after the display has been disabled, primary timing information such as a primary video clock signal, frame boundary, line boundary, and other timing control parameters to display driver integrated circuit 30. Block 104 is merely optional. Control circuitry 16 need not continue sending the timing control information after the mode selection command has been issued.

During the operations of block 106, display driver integrated circuit 30 may send a tearing effect (TE) or other synchronization signal to the one or more processors in control circuitry 16. When display driver integrated circuit 30 sends the tearing effect signal may depend on when the mode selection command was issued. If the mode selection command of block 102 was issued at the end of the current video frame, then display driver integrated circuit 30 can send the tearing effect (synchronization) signal right away and can skip the operations of block 104. If the mode selection command of block 102 was issued during the middle of the current video frame, then display driver integrated circuit 30 may wait until the end of that frame before sending the tearing effect signal.

During the operations of block 108, in response to receiving the tearing effect signal from display driver integrated circuit 30, the one or more processors in control circuitry 16 may send new image data to the display and turn on the display panel to display the new image. If control circuitry 16 is ready to start sending new image data, it can immediately start sending the new image data after receiving the tearing effect or other synchronization signal. If control circuitry 16 is not ready to start sending new image data, it can continue sending old image data until it is ready.

The operations of FIG. 4 are merely illustrative. At least some of the described operations may be modified or omitted; some of the described operations may be performed in parallel; additional processes may be added or inserted between the described operations; the order of certain operations may be reversed or altered; the timing of the described operations may be adjusted so that they occur at slightly different times, or the described operations may be distributed in a system.

Figure 5A:
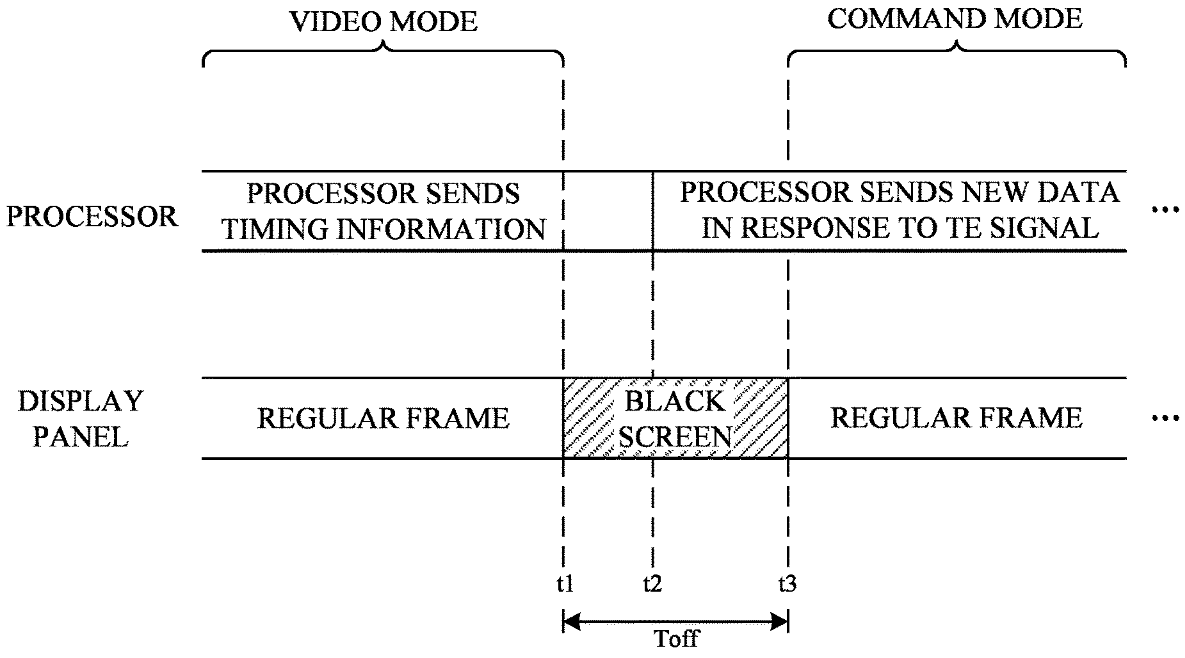
FIGS. 5A and 5B are timing diagrams illustrating the behavior of a system processor and a display panel when switching from the video mode to the command mode in accordance with some embodiments.

FIG. 5A is a timing diagram illustrating the behavior of a system (application) processor and a display panel when switching from the video mode to the command mode. As shown in FIG. 5A, prior to turning off the display panel at time t1, the processor may send primary timing information (e.g., a primary video clock signal, frame boundary, line boundary, and other timing control parameters) while the display panel outputs a regular frame during the video mode. At time t1, the processor sends a command disabling the display panel or otherwise directing the display panel to output a black screen. After the display is turned off, the processor may send a mode selection command directing the display driver integrated circuit to switch to the command mode. The processor may continue sending the primary timing information for one or more frame periods after time t1 to ensure that the mode selection command and/or other mode switching operations are properly executed.

At time t2, the processor may stop sending the primary timing information. At this time, the processor may wait for the display driver integrated circuit to send the tearing effect (or other synchronization signal) before sending new image data. When the display driver integrated circuit may begin sending the tearing effect signal may depend on when the mode selection command was issued. If the mode selection command was sent at the end of the current video frame, then the display driver integrated circuit can send the tearing effect (synchronization) signal right away so that the processor can stop sending the primary timing information right away, thereby reducing the downtime between t1 and t2. If the mode selection command was sent during the middle of the current video frame, then the display driver integrated circuit may wait until the end of that frame before sending the tearing effect signal. The processor may wait one or more frame periods before receiving the tearing effect signal.

Sometime between time t2 and t3, the processor may receive the tearing effect signal and in response, start sending new image data to the display driver integrated circuit. At time t3, the processor sends a command to turn on the display so that the display panel can output a new regular frame in the command mode. In the command mode, the display driver integrated circuit (DDIC) is the primary device, so the processor will follow the lead of the DDIC and will only send new image data when it receives additional tearing effect signals from the DDIC. Turning off the display can help hide any potential front-of-screen issues that might occur when switching between different display modes.

The example shown in FIG. 5A in which the display panel is turned off between times t1 and t3 (see period Toff) is merely illustrative. If desired, the duration of period Toff may be programmable. The duration of period Toff can be increased to ensure proper synchronization between the processor and the display driver integrated circuit. The duration of period Toff can be decreased to minimize the time that the display panel is deactivated.

Figure 5B:
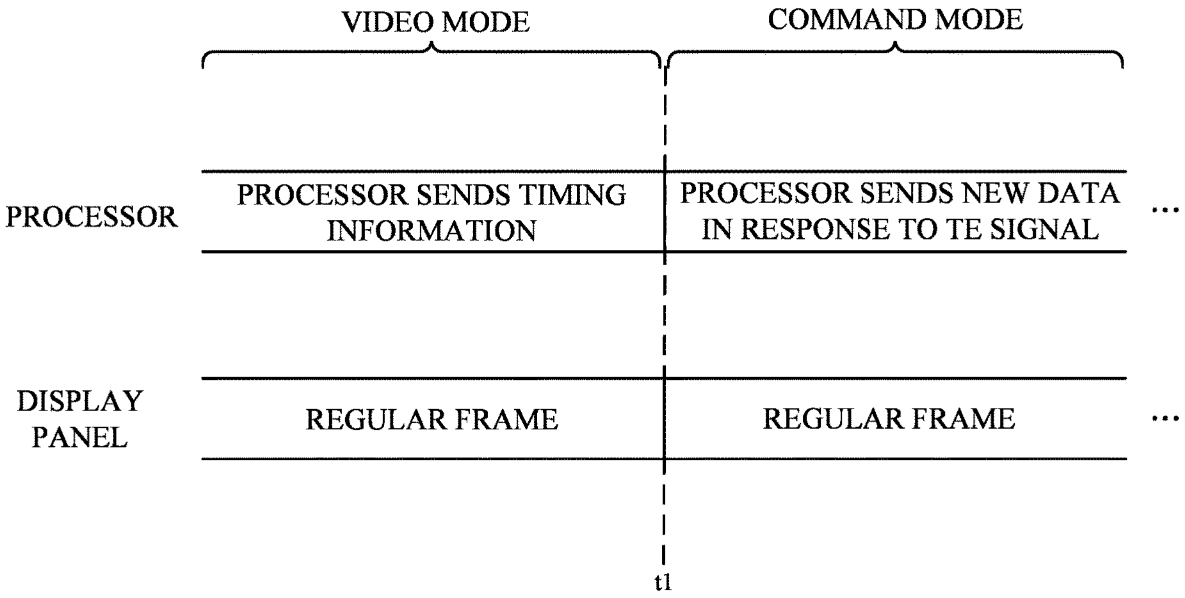

FIG. 5B shows another embodiment where the display panel is kept on when switching from the video mode to the command mode (i.e., device 10 switches from the video mode to the command mode without turning off the display). As shown in FIG. 5B, prior to time t1, the processor may send primary timing information while the display panel outputs a regular frame during the video mode. At time t1, the processor may send a mode selection (switching) command to the display driver integrated circuit to immediately switch to the command mode. The processor may stop sending the primary timing information and begin waiting for a tearing effect (synchronization) signal from the display driver integrated circuit. When the processor receives the tearing effect signal, it can start sending new image data to the display driver integrated circuit so that the display panel can start outputting the new frame. Operated in this way, any delay between operations in the video mode and the command mode is minimized.

Figure 6:
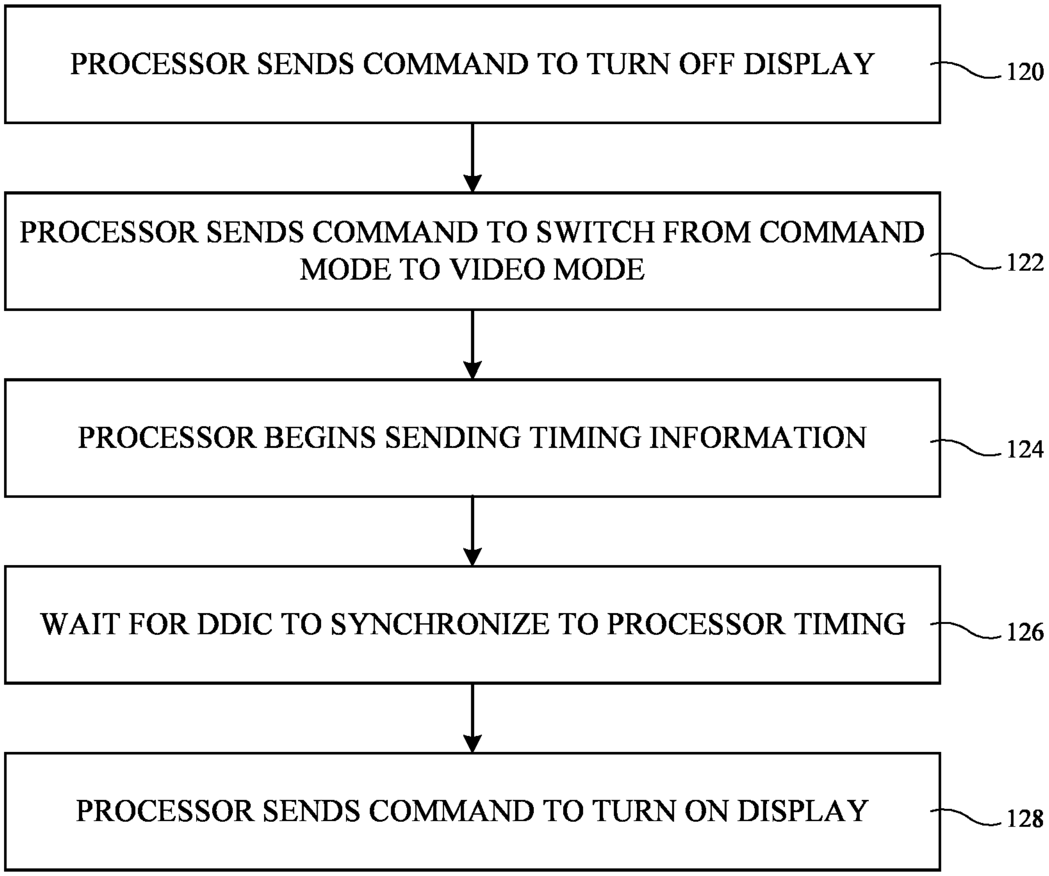
FIG. 6 is a flow chart of illustrative operations for switching from a display command mode to a display video mode in accordance with some embodiments.

FIG. 6 is a flow chart of illustrative operations for switching from command mode 42 to video mode 40. During the operations of block 120, one or more processors in control circuitry 16 (e.g., an application processor or system processor) may send a command to display driver integrated circuit 30 to turn off display 14. The display panel will be disabled or may output a black screen in response to such display off command. Turning off the display can help hide any potential front-of-screen issues that might occur when switching between different display modes.

During the operations of block 122, the one or more processors in control circuitry 16 may send a command directing display driver integrated circuit 30 to switch from command mode 42 to video mode 40. This command is sometimes referred to as a mode switching or mode selection command.

During the operations of block 124, the one or more processors in control circuitry 16 may begin sending primary timing information to display driver integrated circuit 30. Primary timing information may include a primary video clock signal, frame boundary, line boundary, and other timing control parameters. If desired, the mode switching command may be issued only after the timing information is ready to be sent by control circuitry 16.

During the operations of block 126, the one or more processor in control circuitry 16 may wait for display driver integrated circuit 30 to synchronize with the primary timing information (e.g., the display driver integrated circuit may take one or more frame periods to lock to the primary video clock signal).

During the operations of block 128, the one or more processors in control circuitry 16 may send new image data to the display and turn on the display panel to display the new image.

The operations of FIG. 6 are merely illustrative. At least some of the described operations may be modified or omitted; some of the described operations may be performed in parallel; additional processes may be added or inserted between the described operations; the order of certain operations may be reversed or altered; the timing of the described operations may be adjusted so that they occur at slightly different times, or the described operations may be distributed in a system.

Figure 7A:
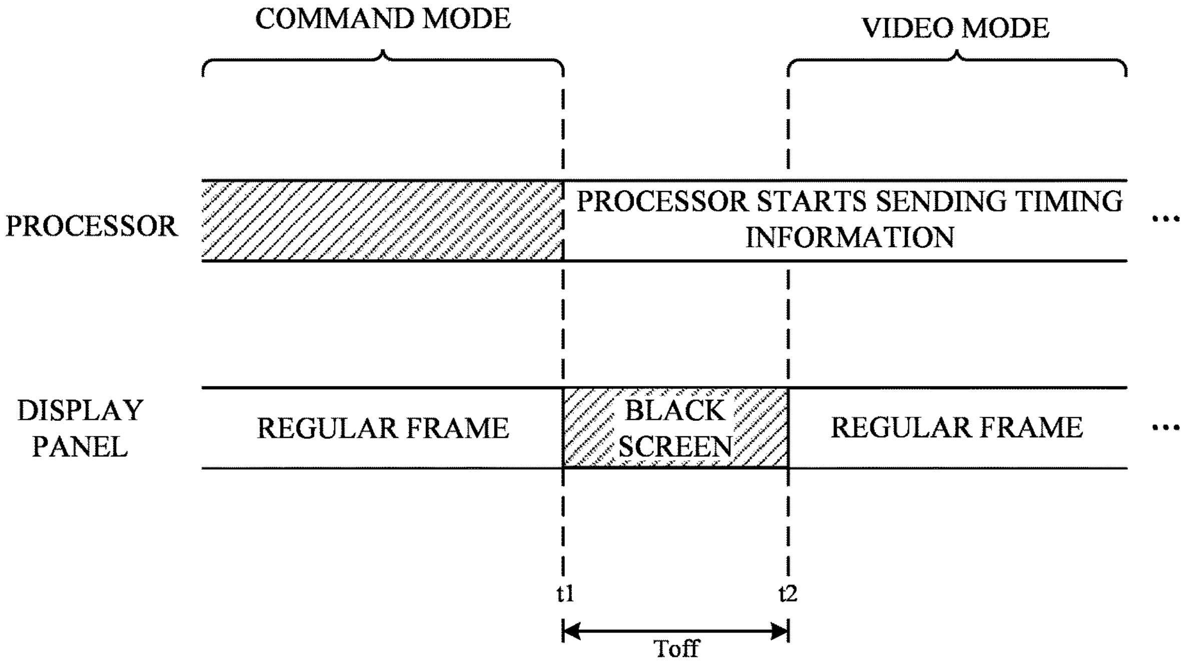
FIGS. 7A and 7B are timing diagrams illustrating the behavior of a system processor and a display panel when switching from the command mode to the video mode in accordance with some embodiments.

FIG. 7A is a timing diagram illustrating the behavior of a system (application) processor and a display panel when switching from the command mode to the video mode. As shown in FIG. 7A, prior to turning off the display panel at time t1, the display panel may display a regular frame during the command mode.

At time t1, the processor sends a command disabling the display panel or otherwise directing the display panel to output a black screen. After the display is turned off, the processor may send a mode selection command directing the display driver integrated circuit to switch to the video mode. At this time, the processor may start sending primary timing information (e.g., a primary video clock signal, frame boundary, line boundary, and other timing control parameters) while the display panel is turned off.

At time t2, the processor sends a command to turn on the display so that the display panel can output a new regular frame in the video mode. In the video mode, the processor is the primary device, so the DDIC will follow the lead of the processor. Turning off the display from time t1 to t2 can help hide any potential front-of-screen issues that might occur when switching between different display modes.

The example shown in FIG. 7A in which the display panel is turned off between times t1 and t2 (see period Toff) is merely illustrative. If desired, the duration of period Toff may be programmable. The duration of period Toff can be increased to ensure proper synchronization between the processor and the display driver integrated circuit. The duration of period Toff can be decreased to minimize the time that the display panel is disabled.

Figure 7B:
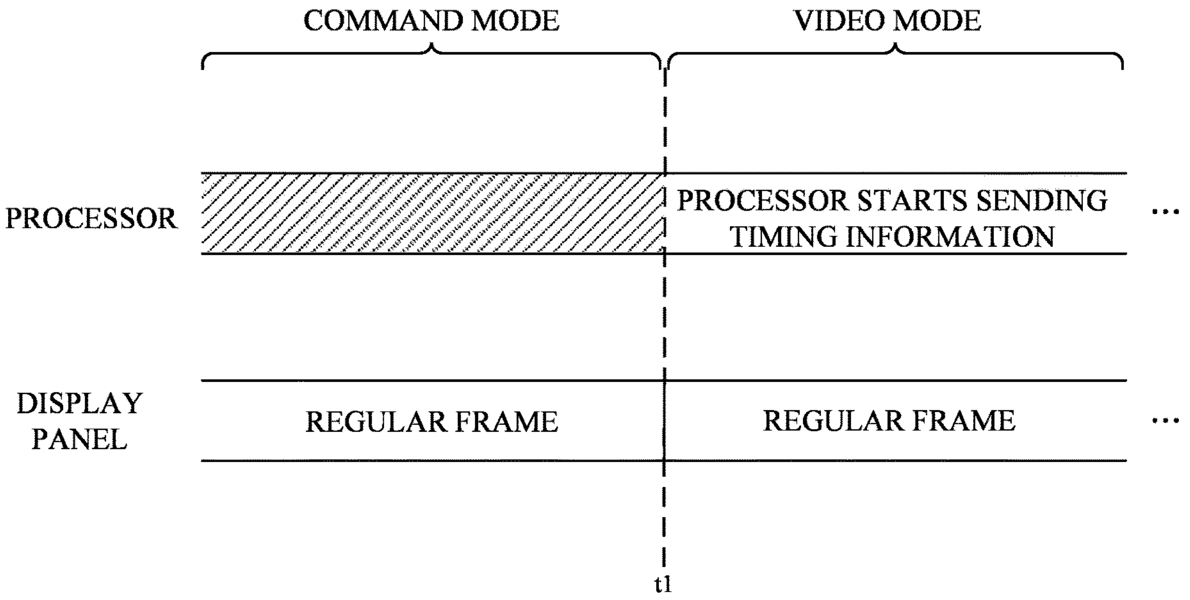

FIG. 7B shows another embodiment where the display panel is kept on when switching from the command mode to the video mode (i.e., device 10 switches from the command mode to the video mode without turning off the display). As shown in FIG. 7B, prior to time t1, the display panel may display a regular frame during the command mode. At time t1, the processor may send a mode selection command directing the display driver integrated circuit to switch to the video mode and may start sending primary timing information (e.g., a primary video clock signal, frame boundary, line boundary, and other timing control parameters) without turning off the display panel. Operated in this way, the display panel can immediately output a new video frame when it switches to the video mode without any downtime to minimize any delay between operations in the video mode and the command mode.

The embodiments described in connection with FIGS. 3-7 in which the display circuitry of device 10 can switch between two different operating modes (e.g., video mode and command mode) is merely illustrative. As another example, the display circuitry might be operable in at least three different display modes and can switch among any of the three display modes in real time without having to turn off device 10. As yet another example, the display circuitry might be operable in four or more different display modes and can switch among any of the plurality of display modes in real time without having to turn off device 10.

In accordance with an embodiment, an electronic device operable in a first mode and a second mode, is provided that includes a display having an array of pixels, a display driver integrated circuit configured to send control and data signals to the display and control circuitry that is configured to run one or more applications on the electronic device and that is coupled to the display via the display driver integrated circuit, in the first mode, the control circuitry is configured as a primary timing component for controlling the timing of the display while the display driver integrated circuit is configured as a secondary timing component, in the second mode, the display driver integrated circuit is configured as the primary timing component for controlling the timing of the display while the control circuitry is configured as the secondary timing component and the control circuitry is further configured to switch between the first mode and the second mode without turning off the electronic device.

In accordance with another embodiment, the electronic device includes a flexible printed circuit coupled between the control circuitry and the display, the display driver integrated circuit is mounted on the flexible printed circuit.

In accordance with another embodiment, the control circuitry is configured to switch between the first mode and the second mode without turning off the display driver integrated circuit.

In accordance with another embodiment, the control circuitry is configured to switch between the first mode and the second mode without turning off the display.

In accordance with another embodiment, the control circuitry is configured to switch between the first mode and the second mode by sending a mode switch command to the display driver integrated circuit.

In accordance with another embodiment, the control circuitry is configured to switch between the first mode and the second mode by turning off the display and sending a mode switch command to the display driver integrated circuit during a period of time the display is turned off.

In accordance with another embodiment, the control circuitry is configured to adjust a duration of the period that the display is turned off when the electronic device is switching between the first mode and the second mode.

In accordance with another embodiment, the control circuitry is configured to switch between the first mode and the second mode by sending a mode switch command to the display driver integrated circuit while the display is on.

In accordance with another embodiment, the control circuitry is configured to switch from the first mode to the second mode by turning off the display, sending a command directing the display driver integrated circuit to switch from the first mode to the second mode, receiving a tearing effect signal from the display driver integrated circuit and in response to receiving the tearing effect signal, sending new image data to the display driver integrated circuit and turning on the display to output the new image data.

In accordance with another embodiment, the control circuitry is configured to switch from the second mode to the first mode by turning off the display, sending a command directing the display driver integrated circuit to switch from the second mode to the first mode, sending timing information to the display driver integrated circuit, waiting for the display driver integrated circuit to synchronize with the control circuitry using the timing information and turning on the display after the display driver integrated circuit has synchronized with the control circuitry using the timing information.

In accordance with another embodiment, the control circuitry is configured to switch from the second mode to the first mode by turning off the display, sending a command directing the display driver integrated circuit to switch from the second mode to the first mode, sending timing information to the display driver integrated circuit, waiting for the display driver integrated circuit to synchronize with the control circuitry using the timing information and turning on the display after the display driver integrated circuit has synchronized with the control circuitry using the timing information.

In accordance with an embodiment, a method of operating an electronic device, is provided that includes using a display to present a visual output, using a display driver integrated circuit to control the display and using control circuitry to run one or more applications on the electronic device, configure the electronic device in a first mode during which the control circuitry operates as a primary timing device for controlling the timing of the display while the display circuit integrated circuit operates as a secondary timing device, configured the electronic device in a second mode during which the display driver integrated circuit operates as the primary timing device for controlling the timing of the display while the control circuitry operates as the secondary timing device and switch between the first and second modes without turning off the electronic device.

In accordance with another embodiment, the method includes using the control circuitry to switch from the first mode to the second mode by turning off the display, sending a command directing the display driver integrated circuit to switch from the first mode to the second mode, receiving a tearing effect signal from the display driver integrated circuit and in response to receiving the tearing effect signal, sending new image data to the display driver integrated circuit and turning on the display to output the new image data.

In accordance with another embodiment, the method includes using the control circuitry to switch from the second mode to the first mode by turning off the display, sending a command directing the display driver integrated circuit to switch from the second mode to the first mode, sending timing information to the display driver integrated circuit, waiting for the display driver integrated circuit to synchronize with the control circuitry using the timing information and turning on the display after the display driver integrated circuit has chronized with the control circuitry using the timing information.

In accordance with another embodiment, the method includes using the control circuitry to switch from the second mode to the first mode by turning off the display, sending a command directing the display driver integrated circuit to switch from the second mode to the first mode, sending timing information to the display driver integrated circuit, waiting for the display driver integrated circuit to synchronize with the control circuitry using the timing information and turning on the display after the display driver integrated circuit has synchronized with the control circuitry using the timing information.

In accordance with another embodiment, the method includes using the control circuitry to switch between the first and second modes without turning off the display.

In accordance with another embodiment, the method includes turning off the display for a period of time, using the control circuitry to switch between the first and second modes while the display is turned off.

In accordance with another embodiment, the method includes using the control circuitry to adjust the period of time during which the display is turned off.

In accordance with an embodiment, a non-transitory computer-readable storage medium storing one or more programs configured to be executed by one or more processors of an electronic device, the electronic device is provided that includes a display coupled to a display driver integrated circuit, the one or more programs including instructions for presenting a visual output, operating the display in a video mode during which the one or more processors is configured as a primary timing module for controlling the timing of the display while the display driver integrated circuit is configured as a secondary timing module, operating the display in a command mode during which display driver integrated circuit is configured as the primary timing module for controlling the timing of the display while the one or more processors is configured as the secondary timing module and switching between the video mode and the command mode without turning off the electronic device.

In accordance with another embodiment, the instructions for switching between the video mode and the command mode includes instructions for turning off the display, sending a mode switch command to the display driver integrated circuit while the display is turned off, waiting for the display to complete switching between the video mode and the command mode, after the display has completed switching between the video mode and the command mode, turning on the display.

The foregoing is merely illustrative and various modifications can be made by those skilled in the art without departing from the scope and spirit of the described embodiments. The foregoing embodiments may be implemented individually or in any combination.

What is claimed is:

1. An electronic device operable in a first mode and a second mode, comprising:
- a display having an array of pixels;
- a display driver integrated circuit that sends control and data signals to the display; and
- control circuitry that runs one or more applications on the electronic device and that is coupled to the display via the display driver integrated circuit, wherein:
  - in the first mode, the control circuitry controls the timing of the display while the display driver integrated circuit operates as a secondary timing component;
  - in the second mode, the display driver integrated circuit controls the timing of the display while the control circuitry operates as the secondary timing component; and
  - the control circuitry switches between the first mode and the second mode without turning off the electronic device and by:
    - turning off the display; and
    - sending a mode switch command to the display driver integrated circuit during a period of time that the display is turned off.

2. The electronic device of claim 1, further comprising:
- a flexible printed circuit coupled between the control circuitry and the display, wherein the display driver integrated circuit is mounted on the flexible printed circuit.

3. The electronic device of claim 1, wherein the control circuitry switches between the first mode and the second mode without turning off the display driver integrated circuit.

4. The electronic device of claim 1, wherein the control circuitry adjusts a duration of the period of time that the display is turned off when the electronic device is switching between the first mode and the second mode.

5. The electronic device of claim 1, wherein the control circuitry switches from the first mode to the second mode by:
- turning off the display;
- sending the mode switch command directing the display driver integrated circuit to switch from the first mode to the second mode;
- receiving a tearing effect signal from the display driver integrated circuit; and
- in response to receiving the tearing effect signal, sending new image data to the display driver integrated circuit and turning on the display to output the new image data.

6. The electronic device of claim 5, wherein the control circuitry switches from the second mode to the first mode by:
- turning off the display;
- sending an additional mode switch command directing the display driver integrated circuit to switch from the second mode to the first mode;
- sending timing information to the display driver integrated circuit;
- waiting for the display driver integrated circuit to synchronize with the control circuitry using the timing information; and
- turning on the display after the display driver integrated circuit has synchronized with the control circuitry using the timing information.

7. The electronic device of claim 1, wherein the control circuitry switches from the second mode to the first mode by:
- turning off the display;
- sending an additional mode switch command directing the display driver integrated circuit to switch from the second mode to the first mode;
- sending timing information to the display driver integrated circuit;
- waiting for the display driver integrated circuit to synchronize with the control circuitry using the timing information; and
- turning on the display after the display driver integrated circuit has synchronized with the control circuitry using the timing information.

8. A method of operating an electronic device, comprising:
- using a display to present a visual output;
- using a display driver integrated circuit to control the display;
- deactivating the display for a period of time; and
- using control circuitry to:
  - run one or more applications on the electronic device;
  - operate the electronic device in a first mode during which the control circuitry controls the timing of the display while the display driver integrated circuit operates as a secondary timing device;

operate the electronic device in a second mode during which the display driver integrated circuit controls the timing of the display while the control circuitry operates as the secondary timing device; and switch between the first and second modes without turning off the electronic device and while the display is deactivated.

9. The method of claim 8, further comprising using the control circuitry to switch from the first mode to the second mode by:

deactivating the display for the period of time;

sending a command directing the display driver integrated circuit to switch from the first mode to the second mode;

receiving a tearing effect signal from the display driver integrated circuit; and in response to receiving the tearing effect signal, sending new image data to the display driver integrated circuit and reactivating the display to output the new image data.

10. The method of claim 9, further comprising using the control circuitry to switch from the second mode to the first mode by:

deactivating the display for the period of time;

sending a command directing the display driver integrated circuit to switch from the second mode to the first mode;

sending timing information to the display driver integrated circuit;

waiting for the display driver integrated circuit to synchronize with the control circuitry using the timing information; and reactivating the display after the display driver integrated circuit has synchronized with the control circuitry using the timing information.

11. The method of claim 8, further comprising using the control circuitry to switch from the second mode to the first mode by:

deactivating the display for the period of time;

sending a command directing the display driver integrated circuit to switch from the second mode to the first mode;

sending timing information to the display driver integrated circuit;

waiting for the display driver integrated circuit to synchronize with the control circuitry using the timing information; and reactivating the display after the display driver integrated circuit has synchronized with the control circuitry using the timing information.

12. The method of claim 8, further comprising:

using the control circuitry to adjust the period of time during which the display is deactivated.

13. A non-transitory computer-readable storage medium storing one or more programs that are executed by one or more processors of an electronic device, wherein the electronic device comprises a display coupled to a display driver integrated circuit, the one or more programs including instructions for:

presenting a visual output with the display;

operating the display in a video mode during which the one or more processors controls the timing of the display while the display driver integrated circuit operates as a secondary timing module;

operating the display in a command mode during which display driver integrated circuit controls the timing of the display while the one or more processors operates as the secondary timing module; and switching between the video mode and the command mode without turning off the electronic device, wherein the instructions for switching between the video mode and the command mode comprise instructions for:

presenting a black screen with the display for a period of time; and switching between the video mode and the command mode during the period of time that the black screen is presented.

14. The non-transitory computer-readable storage medium of claim 13, wherein the instructions for switching between the video mode and the command mode further comprise instructions for:

sending a mode switch command to the display driver integrated circuit during the period of time that the black screen is presented;

waiting for the display to complete switching between the video mode and the command mode; and after the display has completed switching between the video mode and the command mode, presenting the visual output with the display.

15. The non-transitory computer-readable storage medium of claim 13, wherein the instructions for switching between the video mode and the command mode further comprise instructions for adjusting the period of time during which the black screen is presented.

16. The electronic device of claim 1, wherein the display comprises a liquid crystal display or an organic light-emitting diode display.

17. The electronic device of claim 1, wherein the display has a rectangular shape or a non-rectangular shape with curved portions.

18. The electronic device of claim 1, wherein the display is a planar display or a curved display.

19. The electronic device of claim 1, wherein the display is a head-up display or a head-mounted display.

20. The electronic device of claim 1, wherein the display comprises a holographic display.

* * * * *